(12) United States Patent
Satoh (10) Patent No.: US 6,229,545 B1
(45) Date of Patent: *May 8, 2001

(54) METHOD OF GENERATING SOLID-SHELL OBJECT

(75) Inventor: Naoyuki Satoh, Kanagawa (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,536

(22) Filed: Mar. 10, 1998

(30) Foreign Application Priority Data

Mar. 11, 1997 (JP) .................................................. 9-055921

(51) Int. Cl.$^7$ ................................................. G06T 15/00
(52) U.S. Cl. .......................................... 345/419; 345/434
(58) Field of Search ........................ 364/468.04, 468.03, 364/474.24; 706/919; 707/502; 345/420, 433, 435, 434, 419

(56) References Cited

U.S. PATENT DOCUMENTS 5,587,913 * 12/1996 Abrams et al. ....................... 345/420

* cited by examiner

*Primary Examiner*—Mark Zimmerman
*Assistant Examiner*—Philip Stevenson
(74) *Attorney, Agent, or Firm*—Oblon, Spivak, McClelland, Maier & Neustadt, P.C.

(57) ABSTRACT

A method of generating a solid-shell object from a solid object having a shelling-designated surface and other surfaces includes the steps of inwardly displacing the other surfaces to generate displaced surfaces, dividing the shelling-designated surface and the displaced surfaces into portions, removing unnecessary portions among the portions to leave necessary portions of the shelling-designated surface and the displaced surfaces, and connecting the necessary portions of the shelling-designated surface and the displaced surfaces together to generate a first surface model. The method further includes the steps of removing the shelling-designated surface from the solid object to generate a second surface model, and connecting the first surface model and the second surface model to generate the solid-shell object.

36 Claims, 6 Drawing Sheets

METHOD OF GENERATING SOLID-SHELL OBJECT

BACKGROUND OF THE INVENTION

1. Field of the Invention

The present invention generally relates to methods of generating a 3-dimensional solid-shell object having a shell of a uniform thickness or nonuniform thickness, and particularly relates to a method of generating a 3-dimensional solid-shell object having a shell of a uniform thickness or nonuniform thickness in a manner suitable for a CAD/CAM (Computer Aided Design, Computer Aided Manufacturing) device.

2. Description of the Related Art

Figure 1A:
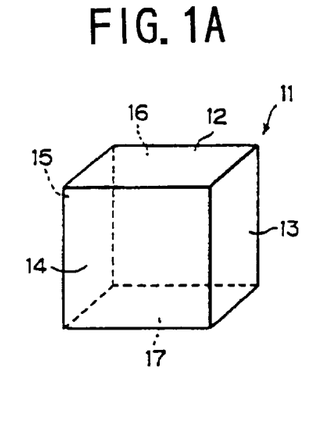
FIGS. 1A through 1G are illustrative drawings for explaining an example of a method which generates a 3-dimensional solid-shell object having a shell of a uniform thickness.
Figure 1B:
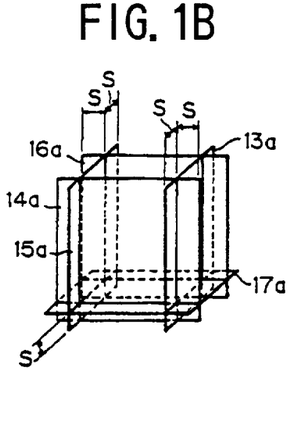
Figure 1C:
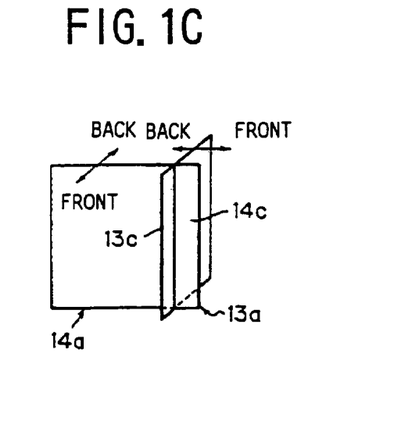
Figure 1D:
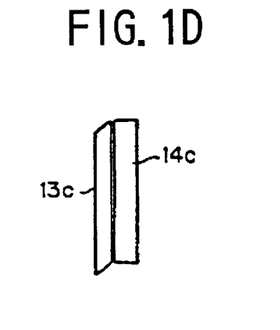
Figure 1E:
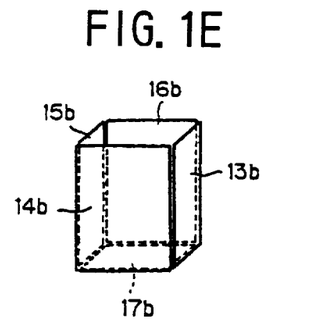

FIGS. 1A through 1G are illustrative drawings for explaining an example of a method which generates a 3-dimensional solid-shell object having a shell of a uniform thickness. In the figures, a designation number 11 refers to a solid object shown in FIG. 1A, and a designation number 11a of FIG. 1G indicates a solid-shell object having a shell of a uniform thickness obtained after a shelling operation. A displaced-surface model is denoted as 11b, as shown FIG. 1F. A surface subjected to the shelling operation is shown as 12 in FIG. 1A. The solid object 11 in FIG. 1A is comprised of surfaces 12 through 17. The surfaces 13 through 17 are displaced inward to generate displaced surfaces 13a through 17a shown in FIG. 1B. After removing interfering portions of the displaced surfaces 13a through 17a, post-interference-removal displaced surfaces 13b through 17b are obtained as shown in FIG. 1E. Unnecessary portions 13c and 14c of the displaced surfaces 13a and 14a, respectively, are also shown in FIG. 1C and FIG. 1D.

In the related art, the solid object (solid model) 11 shown in FIG. 1A has a certain interior portion thereof removed by a shelling operation, and this shelling operation is carried out from the surface 12 subjected to the shelling operation. Hereinafter, the surface 12 is referred to as a shelling-designated surface. In the related art, the shelling operation is performed through steps as follows so as to generate the uniform-thickness-shell solid object 11a.

Figure 1F:
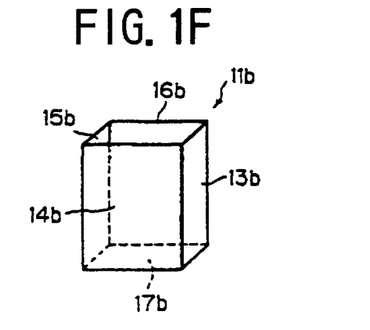
Figure 1G:
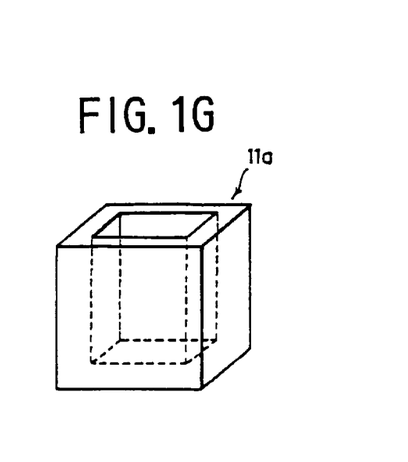

(1) The displaced-surface model 11b is generated.

The displaced-surface model 11b (FIG. 1F) is comprised of displaced surfaces, and is generated as follows.

(1-a) The displaced surfaces 13a through 17a, (FIG. 1B) are generated by displacing the surfaces 13 through 17 inwardly. Here, the surfaces 13 through 17 are all the surfaces of the solid object 11 except the shelling-designated surface 12. The displacement S shown in FIG. 1B is the thickness of a subsequently resulting shell.

(1-b) Unnecessary portions of the displaced surfaces 13a through 17a are removed therefrom to obtain the post-interference-removal displaced surfaces 13b through 17b shown in FIG. 1E. This process is referred to as an interference-removal process, and is performed as follows (1-b-1) Each of the displaced surfaces 13a through 17a is divided into portions along lines when the displaced surfaces 13a through 17a interfere with each other along these lines.

The displaced surfaces 13a through 17a are obtained by inwardly displacing the surfaces 13 through 17 other than the shelling-designated surface 12 by the displacement S. In other words, the surfaces 13 through 17 are shifted toward a direction in which a back side of each surface faces. With regard to the displaced surfaces 13a and 14a, the back side and the front side are shown in FIG. 1C.

(1-b-2) A check is made with respect to each of the portions of the displaced surfaces 13a through 17a as to whether these portions are necessary.

When a given one of the displaced surfaces 13a through 17a is divided into portions by other ones of the displaced surfaces 13a through 17a serving as dividing surfaces, portions positioned on the front side (outer side) of the dividing surfaces are considered unnecessary. In FIG. 1C, for example, the portions 13c and 14c are positioned on the front side of the dividing surfaces with regard to the displaced surfaces 13a and 14a. In this case, therefore, the portions 13c and 14c shown in FIG. 1D are regarded as unnecessary.

(1-b-3) The unnecessary portions identified above are removed.

(1-c) The displaced-surface model 11b (FIG. 1F) is created by connecting the post-interference-removal displaced surfaces 13b through 17b, which are obtained after the interference-removal process.

(2) A set operation is applied to the solid object 11 (FIG. 1A) and the displaced-surface model 11b (FIG. 1F) so as to perform subtraction.

In this manner, a subtraction set operation is performed with regard to the solid object 11 and the displaced-surface model 11b, so that the displaced-surface model 11b is taken out of the solid object 11 from the shelling-designated surface 12. After the shelling operation, the uniform-thickness-shell solid object 11a is obtained.

In the related-art method described above, a set operation is performed with regard to the solid object 11 and the displaced-surface model 11b in addition to the interference-removal process performed during the generation of the displaced-surface model 11b. This results in a large number of interference computations, thereby generating a huge processing load.

The reason why the set operation requires a large number of computations is given as follows.

Data of a solid object is comprised of topology data and geometry data. The topology data describes relations of connections between vertices, edges, loops, faces, etc. The geometry data includes coordinates of vertices, curve data of edges, surface data of faces, etc. When a set operation is performed to effect a subtraction operation, an OR operation, an AND operation, etc., between two given cubic objects, for example, interference computations are necessary with regard to 6×6 combinations between 6 surfaces of one cube and 6 surfaces of the other cube. Since interference operations have to be performed between two given surfaces even if these two surfaces may turn out to be having no interference with each other, each of computations for 6×6 combinations must be carried out with the same diligence, thereby requiring large computation resources.

Such a set operation described above can be considered inefficient when viewed from a certain angle.

In the case of shelling operations, interference between the solid object 11 and the displaced-surface model 11b occurs only between the shelling-designated surface 12 and each of the displaced surfaces 13a through 17a. If interference computations regarding the shelling-designated surface are incorporated into the interference-removal process performed during the generation of the displaced-surface model, a more efficient process can be achieved.

Further, it is apparent that the same applies in the case of generation of a solid-shell object which has a shell of non-uniform thickness.

Accordingly, there is a need for a method of generating a solid-shell object which can be efficiently performed by incorporating interference computations regarding a shelling-designated surface into the interference-removal process performed during generation of a displaced-surface model.

SUMMARY OF THE INVENTION

Accordingly, it is a general object of the present invention to provide a method which can satisfy the need described above.

It is another and more specific object of the present invention to provide a method of generating a solid-shell object which can be efficiently performed by incorporating interference computations regarding a shelling-designated surface into the interference-removal process performed during generation of a displaced-surface model.

In order to achieve the above objects according to the present invention, a method of generating a solid-shell object from a solid object having a shelling-designated surface and other surfaces includes the steps of inwardly displacing the other surfaces to generate displaced surfaces, dividing the shelling-designated surface and the displaced surfaces into portions, removing unnecessary portions among the portions to leave necessary portions of the shelling-designated surface and the displaced surfaces, and connecting the necessary portions of the shelling-designated surface and the displaced surfaces together to generate a first surface model. The method further includes the steps of removing the shelling-designated surface from the solid object to generate a second surface model, and connecting the first surface model and the second surface model to generate the solid-shell object.

In the method described above, interference computations regarding the shelling-designated surface is incorporated or integrated into an interference-removal process, which is carried out through the division of surfaces into the portions and the removal of the unnecessary portions. Because of this integration, the number of interference computations can be reduced compared with that of the related art, whereby the present invention provides an efficient method of generating a solid-shell object.

According to one aspect of the present invention, the method described above is such that the other surfaces are displaced through parallel shifting by the same length of displacement.

In the method described above, the solid-shell object is generated so as to have a shell of a uniform thickness.

Other objects and further features of the present invention will be apparent from the following detailed description when read in conjunction with the accompanying drawings.

DETAILED DESCRIPTION OF THE PREFERRED EMBODIMENTS

Figure 2:
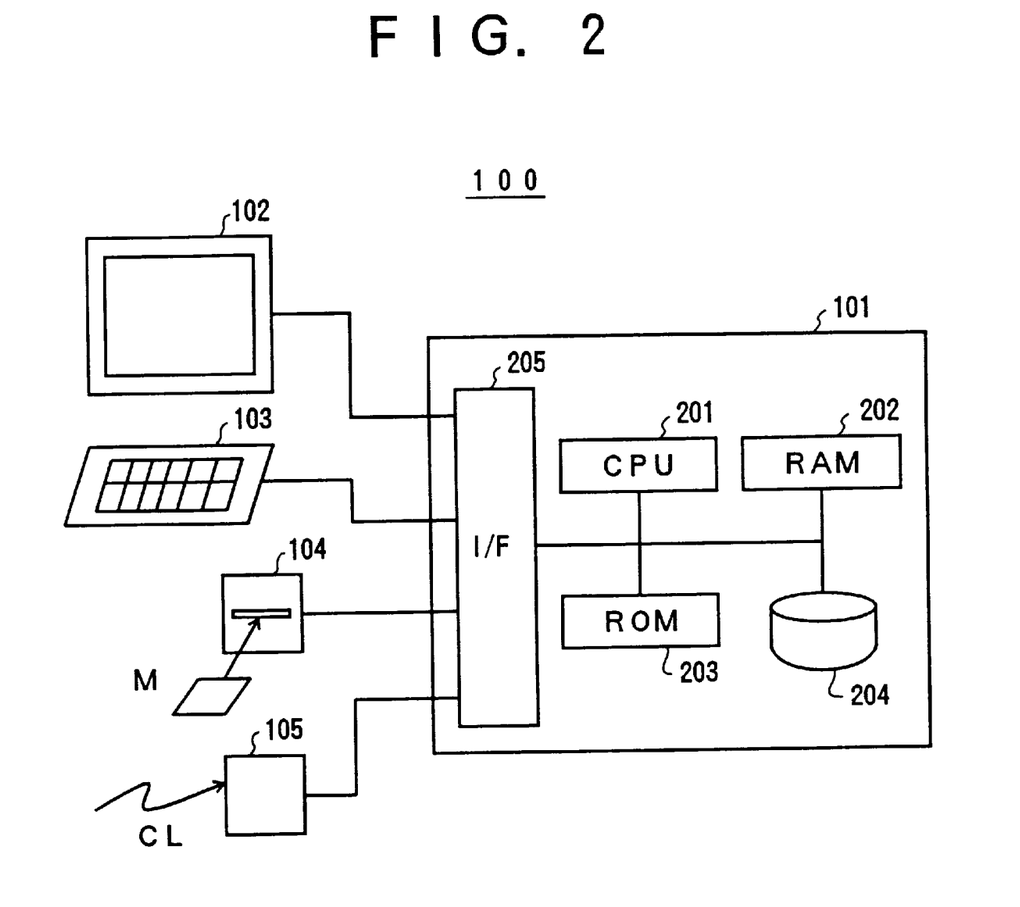
FIG. 2 is an illustrative drawing showing a device which performs a method of generating a solid-shell object according to the present invention.

FIG. 2 is an illustrative drawing showing a device which performs a method of generating a solid-shell object according to the present invention.

A device 100 of FIG. 2 includes a computer 101, a display device 102, an input device 103, an external memory device 104, and a modem 105. The computer 101 includes a CPU 201, a RAM 202, a ROM 203, a secondary memory 204, and an interface 205.

The input device 103 includes such devices as a keyboard and a mouse, and is used for operating the computer 101. The display device 102 displays various information such as characters and images in appropriate forms, and provides an operator with necessary information inclusive of results of operations to help in operating the computer 101.

The CPU 201 performs various processes including those associated with the present invention such as a surface displacing operation, an interference-removal process, etc. The RAM 202 stores data and programs, and, also, provides a memory space for executed processes. The CPU 201 executes the programs to process the data by using the memory space. The ROM 203 mainly stores basic data and programs for controlling the computer 101. The secondary memory 204 may be a hard disk, and is used for storing the data and programs mainly for the purpose of providing a large storage capacity in addition to the RAM 202 and the ROM 203. The interface 205 connects the computer 101 with external devices such as the display device 102, the input device 103, the external memory device 104, and the modem 105.

The external memory device 104 includes a floppy-disk drive, a CD-ROM device, a hard drive, etc., and reads information from or writes information to a memory medium M. The programs used in the present invention may be provided via the memory medium M.

The modem 105 is connected to a communication line CL so as to allow the computer 101 to exchange information via the communication line CL. The programs used in the present invention may be provided via the communication line CL from a remote storage medium.

When programs recorded in computer-usable media are referred to, such programs may be recorded in the memory medium M, the RAM 202, the ROM 203, the secondary memory 204, or any storage connected via the communication line CL.

FIGS. 3A through 3G are illustrative drawings for explaining an embodiment of a method of generating a solid-shell object having a shell of a uniform thickness according to the present invention.

Figure 3A:
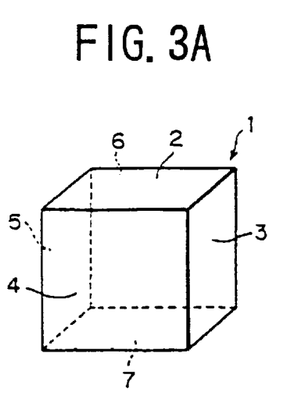
FIGS. 3A through 3G are illustrative drawings for explaining an embodiment of a method of generating a solid-shell object having a shell of a uniform thickness according to the present invention.
Figure 3B:
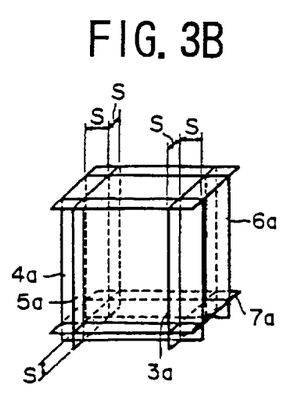
Figure 3C:
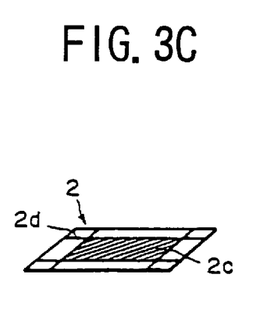
Figure 3D:
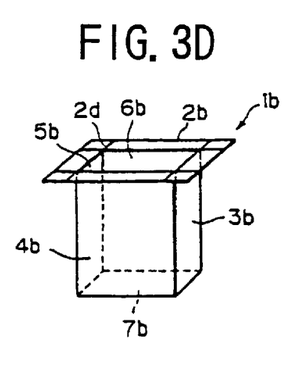
Figure 3E:
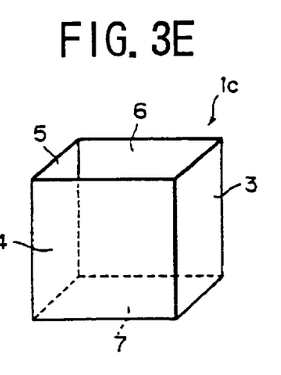
Figure 3F:
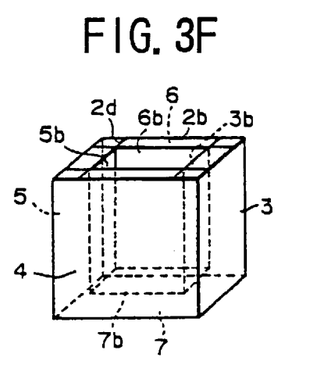
Figure 3G:
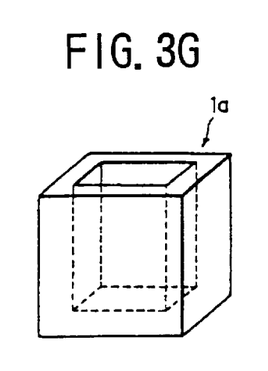

A designation number 1 in FIG. 3A refers to a solid object, and a designation number 1a in FIG. 3G indicates a solid object having a shell of a uniform thickness obtained after shelling the solid object 1. FIG. 3D shows a shelling-surface model 1b, and FIG. 3E shows a surface model 1c. A reference number 2 indicates a shelling-designated surface. A reference number 2b in FIGS. 3D and 3F indicates a post-interference-removal-process shelling-designated surface, which is obtained after an interference-removal process. Further, a reference number 2c in FIG. 3C refers to an unnecessary portion of the shelling-designated surface 2 after the shelling-designated surface 2 is divided into a plurality of portions along dividing lines. These dividing lines are indicated by a reference number 2d. The solid object 1 is comprised of the shelling-designated surface 2 and surfaces 3 through 7. Displaced surfaces 3a through 7a in FIG. 3B are obtained by inwardly displacing the surfaces 3 through 7. Post-interference-removal displaced surfaces 3b through 7b in FIGS. 3D and 3F are obtained after the interference-removal process. A symbol S in FIG. 3B indicates a length of displacement S by which the surfaces 3 through 7 are displaced.

A method of generating a solid-shell object having a shell of a uniform thickness will be performed as follows according to the present invention.

(1) The shelling-surface model 1b is generated.

In the related art, as shown in FIGS. 1A through 1G, the interference-removal process is performed on each of the surfaces 13 through 17, which, are all the surfaces of the solid object 11 except the shelling-designated surface 12. The post-interference-removal displaced surfaces 13b through 17b obtained after the interference-removal process are then connected together to generate the displaced-surface model 11b (FIG. 1F).

In the present invention, on the other hand, the shelling-designated surface 2 is incorporated in the process of interference removal, so that not only the displaced surfaces 3a through 7a but also the shelling-designated surface 2 are connected together at once. Here, a surface model thus generated is referred to as a shelling-surface model rather than as a displaced-surface model. This shelling-surface model is generated as follows.

(1-a) The surfaces 3 through 7 which are all the surfaces of the solid object 1 except the shelling-designated surface 2 are inwardly displaced to generate the displaced surfaces 3a through 7a (FIG. 3B). The displacement S by which the surfaces 3 through 7 are displaced is equal to the thickness of a resulting shell.

(1-b) An interference-removal process is performed as follows.

(1-b-1) Each of the shelling-designated surface 2 and the displaced surfaces 3a through 7a is divided into portions along the lines on which they interfere with each other (FIG. 3B).

(1-b-2) A check is made with respect to each of the portions of the shelling-designated surface 2 and the displaced surfaces 3a through 7a as to whether these portions are necessary.

With respect to a given one of the displaced surfaces 3a through 7a, portions positioned on the front side (outer side) of dividing surfaces are considered unnecessary where the shelling-designated surface 2 and the others of the displaced surfaces 3a through 7a constitute the dividing surfaces. With respect to the shelling-designated surface 2, a check to identify unnecessary portions uses a criterion opposite to that used for the displaced surfaces 3a through 7a. Namely, as shown in FIG. 3C, the portion 2c at the center of the shelling-designated surface 2, which is on the back side of the dividing displaced surfaces 3a through 7a, is regarded as unnecessary portion.

(1-b-3) The unnecessary portions identified above are removed.

(1-c) The post-interference-removal shelling-designated surface 2b and the post-interference-removal displaced surfaces 3b through 7b are connected together to generate the shelling-surface model 1b (FIG. 3D).

(2) The shelling-designated surface 2 is taken off from the solid object 1 so as to generate the surface model 1c (FIG. 3E).

(3) The surface model 1c created at the above step (2) and the shelling-surface model 1b are connected at boundaries (i.e., at the perimeter of the post-interference-removal shelling-designated surface 2b), thereby generating a solid model (FIG. 3F).

(4) The dividing lines 2d are eliminated from the solid model obtained above. This results in the uniform-thickness-shell solid object 1a (FIG. 3G).

In this manner, the present invention treats the shelling-designated surface 2 as one of the displaced surfaces during the interference-removal process when generating a solid-shell object having a shell of a uniform thickness. The interference-removal process first divides the shelling-designated surface 2 into portions (FIG. 1B), each of which is then checked and identified as either a necessary portion or an unnecessary portion. As shown in FIG. 1C, this check identifies a portion of the shelling-designated surface 2 as a necessary portion when this portion would be conversely regarded as an unnecessary portion if the portion was part of the displaced surfaces 3a through 7a. That is, the check uses one criterion with respect to the displaced surfaces 3a through 7a, and uses an opposite criterion for the shelling-designated surface 2. Because of the simply reversed nature of two criteria, the interference-removal process can be performed at once with respect to the shelling-designated surface 2 and the displaced surfaces 3a through 7a at once by introducing a provision that a criterion opposite to that used for displaced surfaces should be used when handling a shelling-designated surface. In this manner, the interference-removal process during generation of a displaced-surface model can incorporate the interference computation regarding the shelling-designated surface 2 and the displaced-surface model.

The above description has been provided with respect to the generation of a solid-shell object having a shell of a uniform thickness. It is apparent, however, that the method of the present invention can be applied to generation of a solid-shell object having a shell of nonuniform thickness.

Figure 4:
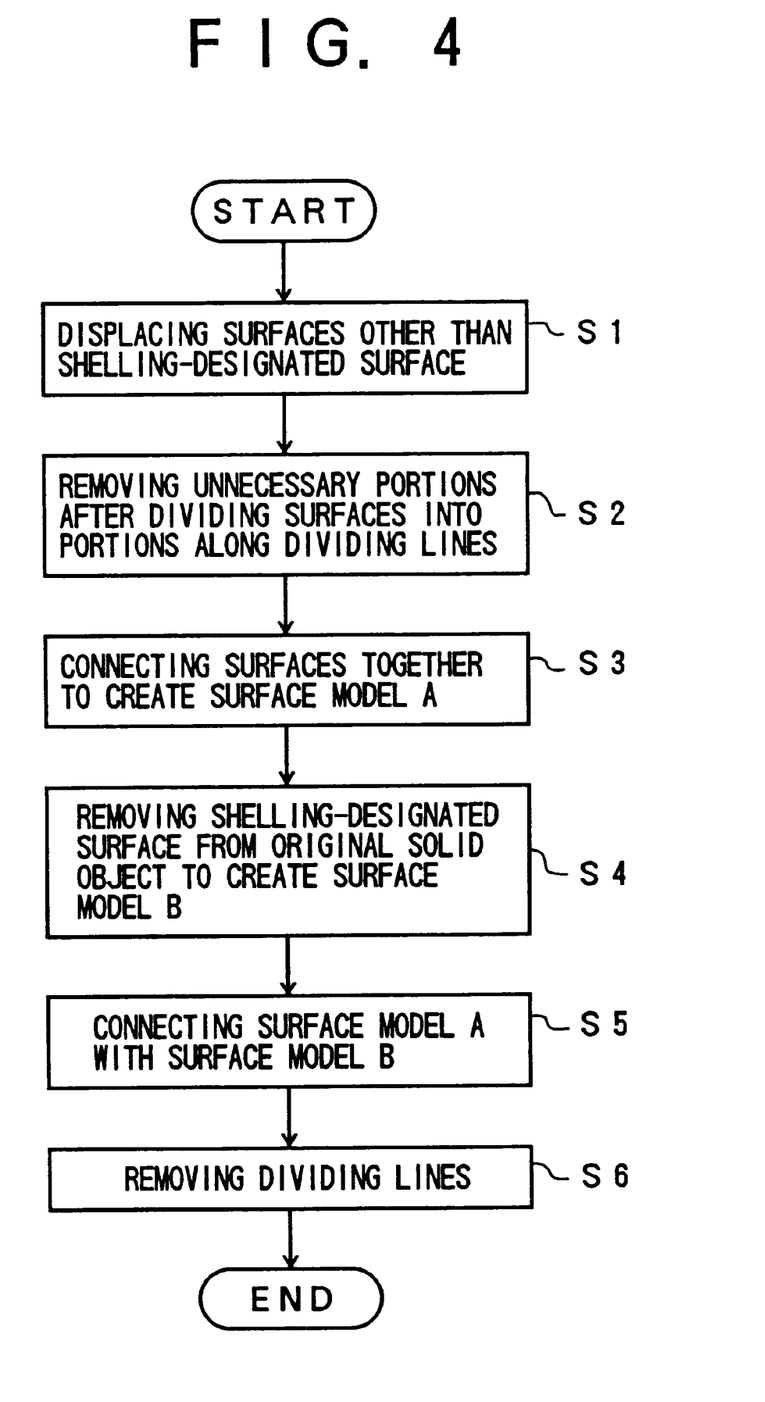
FIG. 4 is a flowchart of a generic method of generating a solid-shell object according to the present invention.

FIG. 4 is a flowchart of a generic method of generating a solid-shell object according to the present invention.

At a step S1, surfaces of a solid object other than a shelling-designated surface are inwardly displaced. Here, a length of displacement may be different with respect to each surface.

As previously described, if the displacement is equal for all the displaced surfaces, a solid-shell object having a shell of a uniform thickness will be generated. If the displacement varies with respect to different surfaces, a solid-shell object having a shell of nonuniform thickness will be generated.

Further, displacement of a given surface may be made through parallel shifting, or may be made such that a resulting displaced surface is not parallel to the given surface.

Figure 5A:
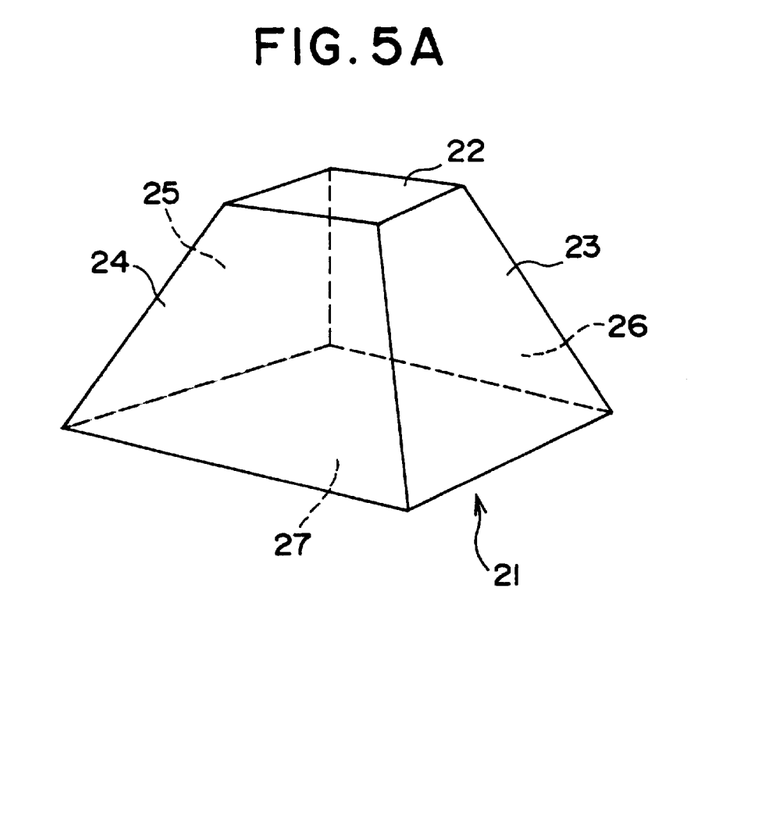
FIGS. 5A and 5B are illustrative drawings showing an example in which displacement is made through non-parallel shift of surfaces.
Figure 5B:
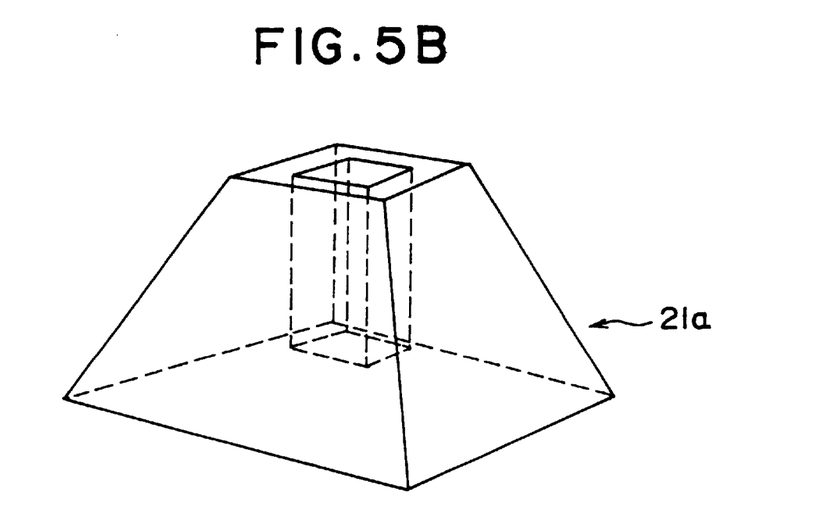

FIGS. 5A and 5B are illustrative drawings showing an example in which displacement is made through the non-parallel shift of surfaces. As shown in FIG. 5A, a solid object is comprised of surfaces 22 through 27, and the surface 22 is a shelling-designated surface. The present invention may apply non-parallel displacement to the surfaces 22 through 26, while the surface 27 experiences a parallel shift. In such a case, a solid-shell object 21a obtained as a result is comprised of a shell having nonuniform thickness as shown in FIG. 5B.

Further, surfaces may be flat, or may be curved.

Figure 6A:
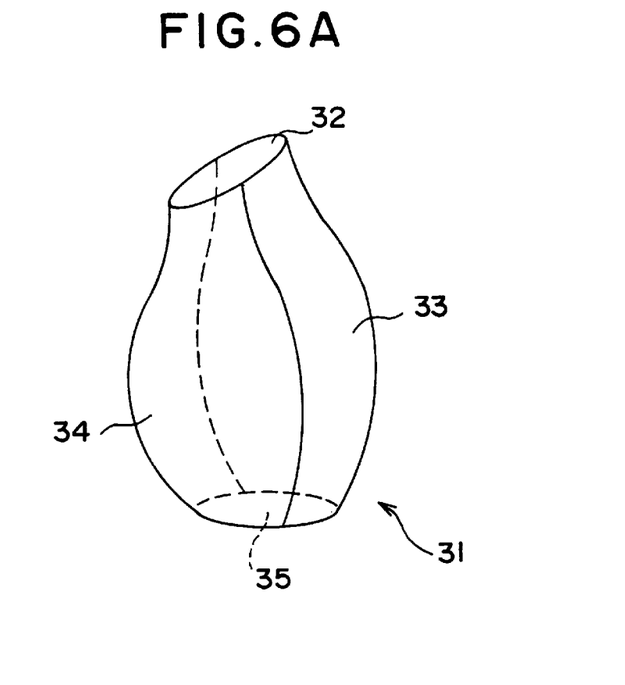
FIGS. 6A and 6B are illustrative drawings showing an example in which displaced surfaces are curved surface.
Figure 6B:
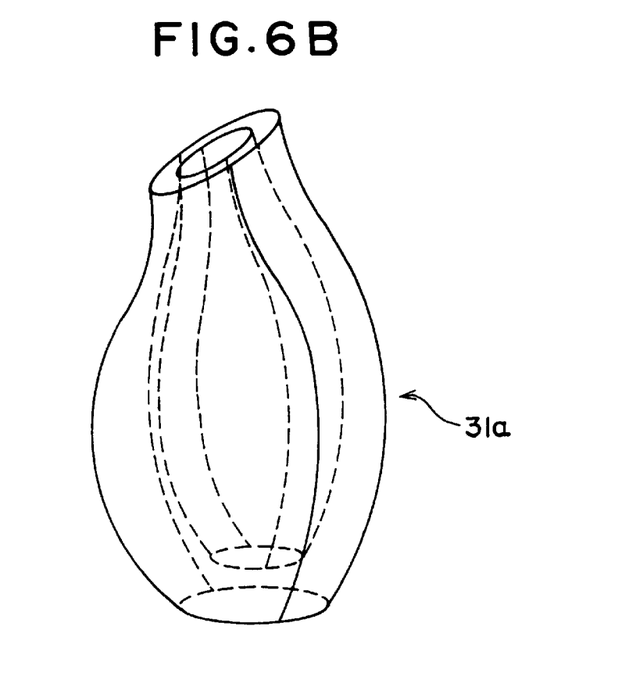

FIGS. 6A and 6B are illustrative drawings showing an example in which displaced surfaces are curved surfaces. As shown in FIG. 6A, a solid object includes a shelling-designated surface 32, curved surfaces 33 and 34, and a flat surface 35. In this case, a solid-shell object 31a resulting from application of the present invention ends up having a shell comprised of curved surfaces.

With reference to FIG. 4 again, at a step S2, the designated surface and displaced surfaces are divided into portions along dividing lines which are defined as intersections between interfering surfaces, so that unnecessary portions are identified and removed. It should be noted, here, that dividing lines may be curved lines when the solid object includes curved surfaces. The step S2 constitutes the interference-removal process.

At a step S3, surfaces are connected together to create a surface model A. That is, remaining portions of the shelling-designated surface and the displaces surfaces are connected together to generate a shelling-surface model (surface model A).

At a step S4, the shelling-designated surface is taken off from the original solid object to generate a surface model B.

At a step S5, the surface model A is connected with the surface model B to generate a solid-shell object with remaining dividing lines.

At a step S6, the dividing lines are removed from the solid-shell object. This ends the procedure.

In this manner, the present invention incorporates or integrates interference computations regarding a shelling-designated surface into the interference-removal process (the step S2 of FIG. 4), so that the number of interference computations can be reduced compared with that of the related art. For this reason, the present invention can provide efficient processes of generating a solid-shell object.

Further, the present invention is not limited to these embodiments, but variations and modifications may be made without departing from the scope of the present invention.

What is claimed is:

1. A method of generating a solid-shell object from a solid object having a shelling-designated surface and other surfaces, said method comprising the steps of:
   a) displacing said other surfaces inwardly to generate displaced surfaces;
   b) dividing said shelling-designated surface and said displaced surfaces into portions;
   c) removing unnecessary portions among said portions to leave necessary portions of said shelling-designated surface and said displaced surfaces;
   d) connecting said necessary portions of said shelling-designated surface and said displaced surfaces together to generate a first surface model;
   e) removing said shelling-designated surface from said solid object to generate a second surface model;
   f) generating said solid-shell object by connecting said first surface model and said second surface model; and
   g) displaying the generated solid-shell object.

2. The method as claimed in claim 1, wherein said step b) comprises a step of dividing said shelling-designated surface and said displaced surfaces into said portions along dividing lines which are defined by intersections between interfering surfaces.

3. The method as claimed in claim 2, further comprising a step of removing said dividing lines from said solid-shell object.

4. The method as claimed in claim 2, wherein said step c) further comprises a step of identifying said unnecessary portions using a first criterion for said displaced surfaces and a second criterion for said shelling-designated surface, said first criterion and said second criterion being opposite to each other.

5. The method as claimed in claim 4, wherein said first criterion stipulates that a given portion on one side of a dividing line is unnecessary when a surface defining said dividing line faces outward in a direction of said one side, and wherein said second criterion stipulates that a given portion on one side of a dividing line is unnecessary when a surface defining said dividing line faces inward in a direction of said one side.

6. The method as claimed in claim 1, wherein said step a) comprises a step of displacing said other surfaces through parallel shifting by the same length of displacement.

7. A device for generating a solid-shell object from a solid object having a shelling-designated surface and other surfaces, said device comprising:
   displacement means for inwardly displacing said other surfaces to generate displaced surfaces;
   division means for dividing said shelling-designated surface and said displaced surfaces into portions;
   first removal means for removing unnecessary portions among said portions to leave necessary portions of said shelling-designated surface and said displaced surfaces;
   first connection means for connecting said necessary portions of said shelling-designated surface and said displaced surfaces together to generate a first surface model;
   second removal means for removing said shelling-designated surface from said solid object to generate a second surface model;
   generating means for generating said solid-shell object by connecting said first surface model and said second surface model; and
   display means for displaying the generated solid-shell object.

8. The device as claimed in claim 7, wherein said division means comprises means for dividing said shelling-designated surface and said displaced surfaces into said portions along dividing lines which are defined by intersections between interfering surfaces.

9. The device as claimed in claim 8, further comprising means for removing said dividing lines from said solid-shell object.

10. The device as claimed in claim 8, wherein said first removal means further comprises means for identifying said unnecessary portions using a first criterion for said displaced surfaces and a second criterion for said shelling-designated surface, said first criterion and said second criterion being opposite to each other.

11. The device as claimed in claim 10, wherein said first criterion stipulates that a given portion on one side of a dividing line is unnecessary when a surface defining said dividing line faces outward in a direction of said one side, and wherein said second criterion stipulates that a given portion on one side of a dividing line is unnecessary when a surface defining said dividing line faces inward in a direction of said one side.

12. The device as claimed in claim 7, wherein said displacement means comprises means for displacing said other surfaces through parallel shifting by the same length of displacement.

13. A machine-readable medium having a program embodied therein for causing a computer to generate a solid-shell object from a solid object having a shelling-designated surface and other surfaces, said program comprising:

displacement means for inwardly displacing said other surfaces to generate displaced surfaces;

division means for dividing said shelling-designated surface and said displaced surfaces into portions;

first removal means for removing unnecessary portions among said portions to leave necessary portions of said shelling-designated surface and said displaced surfaces;

first connection means for connecting said necessary portions of said shelling-designated surface and said displaced surfaces together to generate a first surface model;

second removal means for removing said shelling-designated surface from said solid object to generate a second surface model;

generating means for generating said solid-shell object by connecting said first surface model and said second surface model; and display control means for causing the display of the generated solid-shell object on a display device.

14. The machine-readable medium as claimed in claim 13, wherein said division means comprises means for dividing said shelling-designated surface and said displaced surfaces into said portions along dividing lines which are defined by intersections between interfering surfaces.

15. The machine-readable medium as claimed in claim 14, further comprising means for removing said dividing lines from said solid-shell object.

16. The machine-readable medium as claimed in claim 14, wherein said first removal means further comprises means for identifying said unnecessary portions using a first criterion for said displaced surfaces and a second criterion for said shelling-designated surface, said first criterion and said second criterion being opposite to each other.

17. The machine-readable medium as claimed in claim 16, wherein said first criterion stipulates that a given portion on one side of a dividing line is unnecessary when a surface defining said dividing line faces outward in a direction of said one side, and wherein said second criterion stipulates that a given portion on one side of a dividing line is unnecessary when a surface defining said dividing line faces inward in a direction of said one side.

18. The machine-readable medium as claimed in claim 13, wherein said displacement means comprises means for displacing said other surfaces through parallel shifting by the same length of displacement.

19. A method of generating a solid-shell object from a solid object having a shelling-designated surface and other surfaces, said method comprising the steps of:

a) displacing said other surfaces inwardly to generate displaced surfaces;

b) dividing said shelling-designated surface and said displaced surfaces into portions;

c) removing unnecessary portions among said portions to leave necessary portions of said shelling-designated surface and said displaced surfaces;

d) connecting said necessary portions of said shelling-designated surface and said displaced surfaces together to generate a first surface model;

e) removing said shelling-designated surface from said solid object to generate a second surface model;

f) generating said solid-shell object by connecting said first surface model and said second surface model; and g) storing the generated solid-shell object in a memory in a form suitable for subsequent visual presentation of the generated solid-shell object.

20. The method as claimed in claim 19, wherein said step b) comprises a step of dividing said shelling-designated surface and said displaced surfaces into said portions along dividing lines which are defined by intersections between interfering surfaces.

21. The method as claimed in claim 20, further comprising a step of removing said dividing lines from said solid-shell object.

22. The method as claimed in claim 20, wherein said step c) further comprises a step of identifying said unnecessary portions using a first criterion for said displaced surfaces and a second criterion for said shelling-designated surface, said first criterion and said second criterion being opposite to each other.

23. The method as claimed in claim 22, wherein said first criterion stipulates that a given portion on one side of a dividing line is unnecessary when a surface defining said dividing line is unnecessary when a direction of said one side, and wherein said second criterion stipulates that a given portion on one side of a dividing line is unnecessary when a surface defining said dividing line faces inward in a direction of said one side.

24. The method as claimed in claim 19, wherein said step a) comprises a step of displacing said other surfaces through parallel shifting by the same length of displacement.

25. A device for generating a solid-shell object from a solid object having a shelling-designated surface and other surfaces, said device comprising:

displacement means for inwardly displacing said other surfaces to generate displaced surfaces;

division means for dividing said shelling-designated surface and said displaced surfaces into portions;

first removal means for removing unnecessary portions among said portions to leave necessary portions of said shelling-designated surface and said displaced surfaces;

first connection means for connecting said necessary portions of said shelling-designated surface and said displaced surfaces together to generate a first surface model;

second removal means for removing said shelling-designated surface from said solid object to generate a second surface model;

generating means for generating said solid-shell object by connecting said first surface model and said second surface model; and storing means for storing the generated solid-shell object in a form suitable for subsequent visual presentation of the generated solid-shell object.

26. The machine-readable medium as claimed in claim 25, wherein said division means comprises means for dividing said shelling-designated surface and said displaced surfaces into said portions along dividing lines which are defined by intersections between interfering surfaces.

27. The machine-readable medium as claimed in claim 26, further comprising means for removing said dividing lines from said solid-shell object.

28. The machine-readable medium as claimed in claim 26, wherein said first removal means further comprises means for identifying said unnecessary portions using a first criterion for said displaced surfaces and a second criterion for said shelling-designated surface, said first criterion and said second criterion being opposite to each other.

29. The machine-readable medium as claimed in claim 28, wherein said first criterion stipulates that a given portion on one side of a dividing line is unnecessary when a surface defining said dividing line faces outward in a direction of said one side, and wherein said second criterion stipulates that a given portion on one side of a dividing line is unnecessary when a surface defining said dividing line faces inward in a direction of said one side.

30. The machine-readable medium as claimed in claim 25, wherein said displacement means comprises means for displacing said other surfaces through parallel shifting by the same length of displacement.

31. A machine-readable medium having a program embodied therein for causing a computer to generate a solid-shell object from a solid object having a shelling-designated surface and other surfaces, said program comprising:

displacement means for inwardly displacing said other surfaces to generate displaced surfaces;

division means for dividing said shelling-designated surface and said displaced surfaces into portions;

first removal means for removing unnecessary portions among said portions to leave necessary portions of said shelling-designated surface and said displaced surfaces;

first connection means for connecting said necessary portions of said shelling-designated surface and said displaced surfaces together to generate a first surface model;

second removal means for removing said shelling-designated surface from said solid object to generate a second surface model;

generating means for generating said solid-shell object by connecting said first surface model and said second surface; and storing control means for causing the storing of the generated solid-shell object in a memory in a form suitable for subsequent visual presentation of the generated solid-shell object.

32. The machine-readable medium as claimed in claim 31, wherein said division means comprises means for dividing said shelling-designated surface and said displaced surfaces into said portions along dividing lines which are defined by intersections between interfering surfaces.

33. The machine-readable medium as claimed in claim 32, further comprising means for removing said dividing lines from said solid-shell object.

34. The machine-readable medium as claimed in claim 32, wherein said first removal means further comprises means for identifying said unnecessary portions using a first criterion for said displaced surfaces and a second criterion for said shelling-designated surface, said first criterion and said second criterion being opposite to each other.

35. The machine-readable medium as claimed in claim 34, wherein said first criterion stipulates that a given portion on one side of a dividing line is unnecessary when a surface defining said dividing line faces outward in a direction of said one side, and wherein said second criterion stipulates that a given portion on one side of a dividing line is unnecessary when a surface defining said dividing line faces inward in a direction of said one side.

36. The machine-readable medium as claimed in claim 31, wherein said displacement means comprises means for displacing said other surfaces through parallel shifting by the same length of displacement.

* * * * *